Oct. 31, 1967 H. A. ZIMMERMAN 3,350,576
TRIGGER COUNTDOWN CIRCUIT WHICH IS ARMED AND TRIGGERED BY
DIFFERENT PORTIONS OF THE SAME TRIGGER PULSE
Filed Jan. 29, 1965 2 Sheets-Sheet 1

HENRY A. ZIMMERMAN
INVENTOR
BY
BUCKHORN, BLORE, KLARQUIST & SPARKMAN
ATTORNEYS

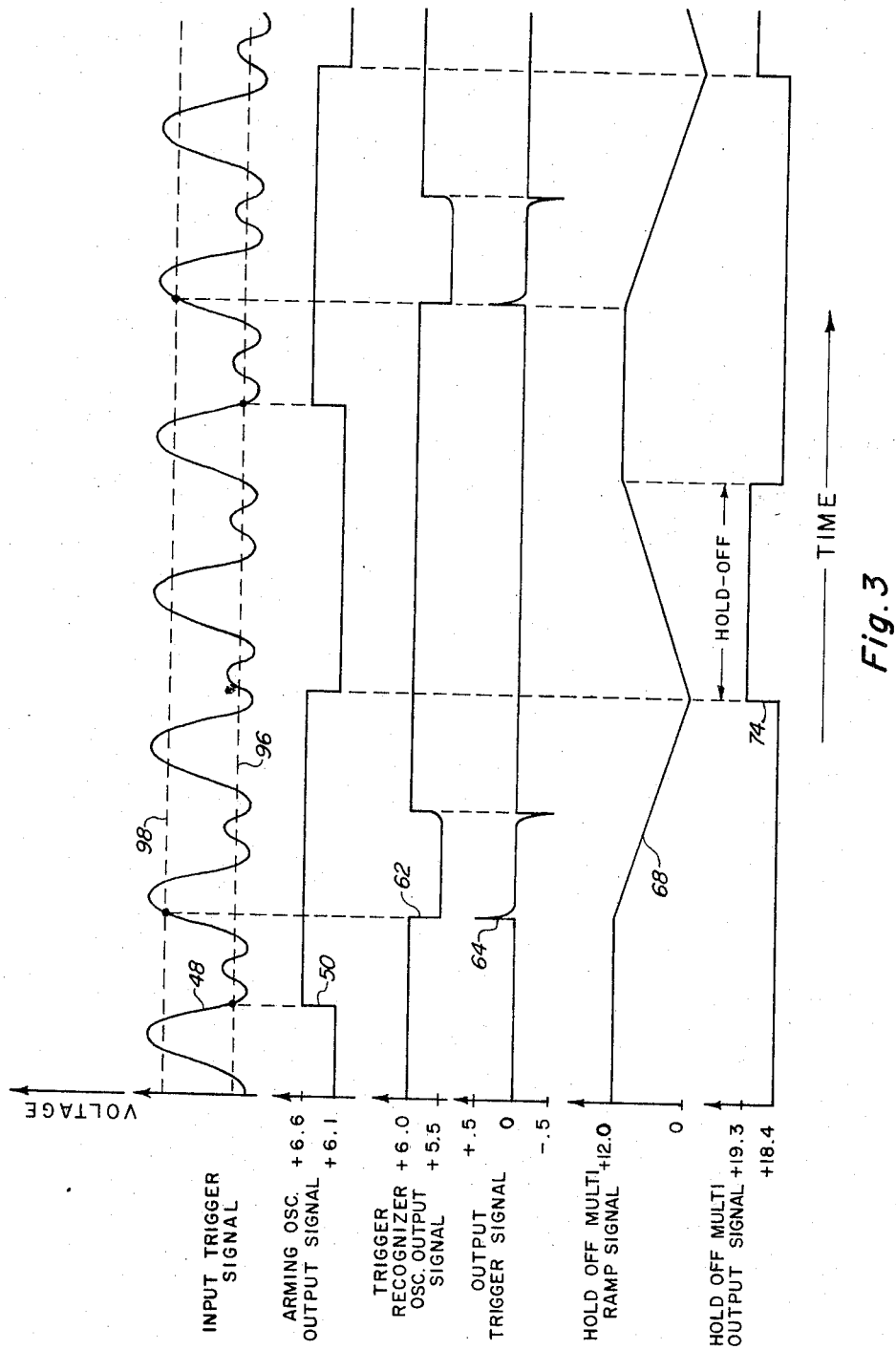

United States Patent Office 3,350,576
Patented Oct. 31, 1967

3,350,576
TRIGGER COUNTDOWN CIRCUIT WHICH IS ARMED AND TRIGGERED BY DIFFERENT PORTIONS OF THE SAME TRIGGER PULSE
Henry A. Zimmerman, Beaverton, Oreg., assignor to Tektronix, Inc., Beaverton, Oreg., a corporation of Oregon
Filed Jan. 29, 1965, Ser. No. 429,033
9 Claims. (Cl. 307—88.5)

ABSTRACT OF THE DISCLOSURE

The subject matter of the present invention relates generally to trigger regenerator circuits and in particular to a trigger countdown circuit which produces an output trigger pulse after a predetermined number of input trigger pulses have been applied to such countdown circuit. The trigger countdown circuit of the present invention operates like a Schmitt trigger type multivibrator circuit in that it has a hysteresis character so that the trigger countdown circuit is first "armed" and then triggered by different portions of the same input trigger pulse crossing two spaced triggering levels in opposite directions. By employing a separate triggered arming circuit to arm an output switching circuit and enable such output switching circuit to be triggered to produce the output trigger pulse as well as a holdoff circuit to prevent the arming circuit from being triggered to produce its arming signal until after the output switching circuit has reverted to its quiescent stable state, the present trigger countdown circuit is provided with great triggering stability and sensitivity. One embodiment of the trigger countdown circuit employing tunnel diodes is capable of being triggered at a frequency up to 500 megacycles per second by pulses having an amplitude as low as 1.0 millivolt.

---

The trigger countdown circuit of the present invention is especially useful when employed in a cathode ray oscilloscope of the sampling type in order to trigger the timing unit of such sampling oscilloscope. In this regard the output of the trigger countdown circuit may be connected to the input of the circuit disclosed in copending U.S. patent application Ser. No. 426,584, filed on Jan. 19, 1965, by George J. Frye and entitled, "Ramp Generator and Comparator Circuit Employing Non-Saturating Gate." However, the present trigger circuit can be employed in any trigger regenerator circuit requiring greater triggering stability and capable of operation at higher frequencies and lower triggering amplitudes than conventional trigger circuits.

The trigger countdown circuit of the present invention has several advantages over conventional circuits of this type since it combines the stability of a conventional Schmitt trigger circuit but is capable of being triggered by trigger signals of much higher frequency. In addition, the present trigger countdown circuit may be operated with extremely high sensitivity by providing it with a small hysteresis so that such circuit is triggered by low amplitude signals. For example, one embodiment of the present trigger countdown circuit triggers at a voltage level of about 1 millivolt up to a frequency of about 500 megacycles per second when connected to a 50 ohm source of trigger signals. Thus, the present trigger countdown circuit has a much greater sensitivity than a single tunnel diode connected as a bistable switching circuit which has a hysteresis characteristic like a Schmitt multivibrator and operates up to a maximum frequency of about 100 megacycles per second, since such tunnel diode switching circuit can only be triggered by a signal of about 500 millivolts or more amplitude.

Briefly, one embodiment of the trigger countdown circuit of the present invention includes a bistable trigger recognizer switching circuit and a bistable arming switching circuit having their inputs connected in common to a source of input trigger pulses. The output of the arming oscillator is connected to the trigger recognizer circuit in order to apply an arming signal to such trigger recognizer circuit to enable it to be triggered by a different portion of the same input trigger pulse which is employed to trigger the arming circuit and cause it to produce the arming signal. The output signal of the trigger recognizer circuit is transmitted to the output terminal of the trigger countdown circuit and also to a monostable hold-off circuit in order to trigger such hold-off circuit. The triggered hold-off circuit produces a hold-off signal which is applied to the trigger recognizer circuit and the arming circuit in order to revert both of such switching circuits and prevent them from being triggered until after the termination of the hold-off signal. It should be noted that in another embodiment of the invention the trigger recognizer circuit is monostable so that it is not reverted by the hold-off signal but does so automatically. Since the trigger recognizer circuit cannot be triggered until it is "armed" by an arming circuit and the arming circuit cannot be triggered to produce the arming signal until after the hold-off signal terminates, the trigger countdown circuit is armed only during a safe interval after complete recovery of the countdown circuit by an arming pulse having a much faster rise time than the input trigger pulse which prevents unstable triggering.

It is therefore one object of the present invention to provide an improved trigger regenerator circuit having great stability and capable of being triggered by signals of higher frequency.

Another object of the present invention is to provide an improved trigger regenerator circuit having a hysteresis characteristic so that such trigger countdown circuit is "armed" and triggered at two separate amplitude levels by different polarity portions of the same trigger signal in order to provide such circuit with greater triggering stability.

A further object of the present invention is to provide an improved trigger countdown circuit having a hysteresis characteristic which may be adjusted to a small value to enable triggering by low amplitude input trigger signals to provide such circuit with a high trigger sensitivity.

An additional object of the present invention is to provide an improved trigger countdown circuit which operates in a simple and reliable manner over a wider range of input trigger frequencies up to several thousand megacycles per second.

Other objects and advantages of the present invention will become apparent from the following detailed description of a preferred embodiment thereof and from the attached drawings of which:

FIG. 3 shows the wave forms of electrical signals received and produced by the trigger countdown circuit of FIG. 2, such signals being shown in time relationship to one another.

Figure 1:
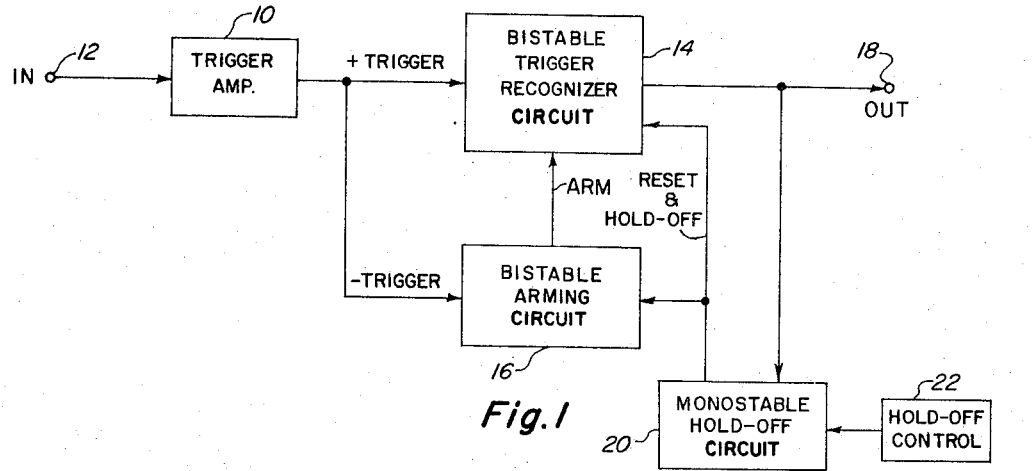
FIG. 1 is a block diagram of one embodiment of the trigger countdown circuit of the present invention.

As shown in FIG. 1, one embodiment of the trigger countdown circuit of the present invention includes a trigger amplifier 10, having its input connected to an input terminal 12 and its output connected to the inputs of both a trigger recognizer circuit 14 and an arming circuit 16. Both the trigger recognizer circuit and the arming circuit are connected as bistable switching circuits which may be tunnel diode circuits or conventional bistable multivibrators. The output of the trigger recognizer circuit 14 is connected to an output terminal 18 and to the input of a monostable hold-off switching circuit 20 so that the output signal of the trigger countdown circuit also triggers such hold-off circuit. The output of the hold-off circuit is connected to both the trigger recognizer circuit and the arming circuit in order to revert such switching circuits to their quiescent state and to prevent them from being retriggered for a predetermined time. In addition, the output of the arming circuit is connected to the trigger recognizer circuit 14 to "arm" such trigger recognizer circuit to enable it to be triggered by an input trigger pulse transmitted from trigger amplifier 10 after such arming circuit has been triggered by such pulse.

The operation of the trigger countdown circuit of the present invention broadly disclosed in FIG. 1 will now be briefly described. When an input trigger signal is applied to the input terminal 12 and transmitted through the trigger amplifier 10, a negative going portion of such trigger signal triggers the arming circuit 16. Upon being triggered the arming circuit applies an arming signal to the trigger recognizer circuit 14 to enable a positive going portion of the same trigger signal to trigger the trigger recognizer circuit. The output signal of the trigger recognizer circuit 14 is transmitted to the output terminal 18 to provide the output trigger pulse and to the hold-off circuit 20 to trigger such hold-off circuit. After a predetermined time determined by the setting of a hold-off control 22 in the hold-off circuit, such hold-off circuit produces a hold-off signal which reverts both the trigger recognizer circuit 14 and the arming circuit 16 back to their quiescent stable states and prevents such switching circuits from being retriggered until the hold-off signal terminates. The length of the hold-off signal determines the frequency division of the countdown circuit and is adjusted by the hold-off control 22.

After the hold-off signal terminates, the arming circuit can be triggered by the next negative going portion of an input trigger pulse which exceeds its triggering level, but the trigger recognizer circuit cannot be triggered until after such arming circuit has been triggered and has applied the arming signal to such trigger recognizer circuit. Thus, the trigger recognizer circuit cannot be triggered during the return of the slowly falling hold-off signal which could cause unstable operation, but is only triggered after the fast rising arming signal is applied to such trigger recognizer circuit. This means that the trigger recognizer circuit is always triggered at the same amplitude on the input trigger signal and prevents spurious triggering tending to be caused by variation in the frequency of the trigger signal and changes in the hold-off period.

From the above it can be seen that the trigger countdown circuit of the present invention operates in the manner of a Schmitt trigger type multivibrator circuit, having a hysteresis characteristic bounded by two spaced triggering levels which correspond to the triggering levels of the arming circuit and the recognizer circuit. Thus a negative going portion of the input trigger signal which crosses the lower triggering level may be employed to trigger the arming circuit to arm the trigger recognizer circuit and a positive going portion of such trigger signal which crosses the upper triggering level may be used to trigger the trigger recognizer circuit and produce an output trigger signal. As a result of employing the same input trigger signal to arm the trigger recognizer circuit which subsequently triggers such circuit on a different portion of such trigger signal, a much more stable triggering operation is produced which is not affected by changes in frequency or slope of the triggering signal. In addition, by employing the hold-off circuit a trigger countdown or frequency divider circuit is provided which is not possible with a conventional Schmitt trigger circuit because such Schmitt trigger circuit goes through a complete cycle of operation for each input trigger pulse. This also enables the present circuit to be triggered by higher frequency triggering signals, since such circuit has a slower repetition rate than a conventional Schmitt multivibrator. Furthermore, the triggering levels of the trigger recognizer circuit and arming circuit may be adjusted to reduce the width of the hysteresis characteristic of the trigger countdown circuit in order to enable lower amplitude trigger signals to be employed to operate such countdown circuit for greater sensitivity.

Figure 2:
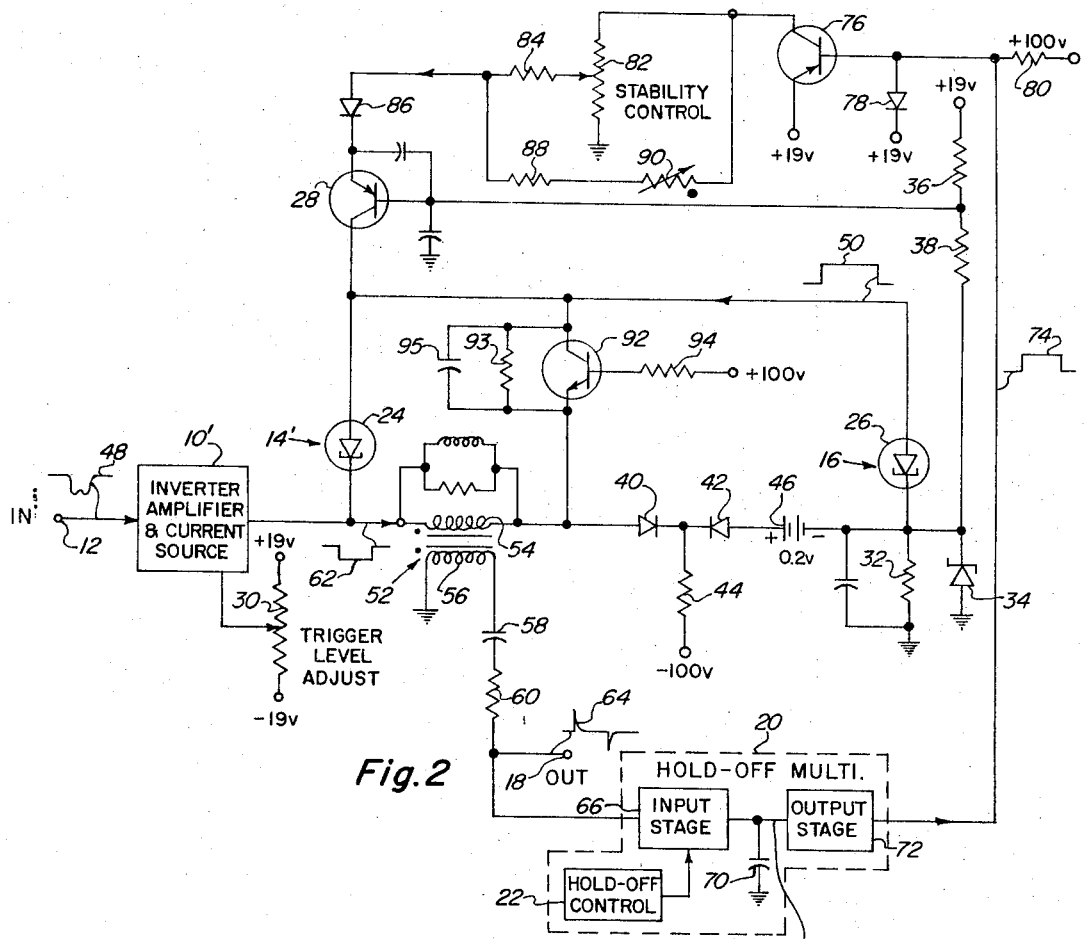
FIG. 2 is a schematic diagram of another embodiment of trigger countdown circuit which differs from the trigger countdown circuit of FIG. 1 in employing a monostable trigger recognizer circuit.

Another embodiment of the trigger countdown circuit is shown in FIG. 2 and includes a pair of tunnel diodes 24 and 26, each of about 10 milliamperes peak current, which are connected to provide the trigger recognizer circuit 14 and the arming circuit 16, respectively, of FIG. 1. However, tunnel diode 24 is connected as a monostable switching circuit so that it returns automatically to its quiescent state after triggering and is not reverted by the hold-off switching circuit 20 which may be a monostable multivibrator. The anodes of the tunnel diodes 24 and 26 are connected in common to the collector of a common base amplifier transistor 28 which may be of the PNP type and supplies bias current to such tunnel diodes. The cathode of tunnel diode 24 is connected to the output of the trigger amplifier 10', which also serves as a source of substantially constant bias current of about 7 milliamperes for such tunnel diode. The trigger amplifier 10' may be similar to that described in copending U.S. patent application Ser. No. 341,980, now Patent No. 3,281,705, filed Feb. 3, 1964 by George J. Frye and entitled "Wide Band Signal Inverter Circuit" so that such amplifier inverts the input trigger pulse and also isolates the trigger source from the rest of the circuit. The amount of this regulated bias current may be adjusted by moving the tap of a potentiometer 30 of 100 kilohms in the trigger amplifier, having its end terminals connected to a pair of D.C. voltage sources of +19 volts and —19 volts in order to vary the triggering level of both tunnel diodes 24 and 26 together. The cathode of tunnel diode 26 is connected to ground through a resistor 32 of 62 ohms to provide a series circuit between input terminal 12 and ground through the two tunnel diodes so that the same input trigger pulse is applied simultaneously to both tunnel diodes but with opposite polarity.

A Zener diode 34, having its anode grounded and its cathode connected in common to the cathode of tunnel diode 26 and to a positive D.C. voltage source of +19 volts through resistors 36 and 38 of 5.6 kilohms and 1.24 kilohms respectively, is provided to maintain the voltage on the cathode of such tunnel diode at +6 volts. Since tunnel diodes 24 and 26 are of opposite polarity the voltage drop across such tunnel diodes compensate for each other and cause the cathode of tunnel diode 24 to also be biased at +6 volts. The D.C. bias current flowing through tunnel diodes 24 and 26 quiescently biases each of such tunnel diodes in a low voltage stable state. The cathodes of tunnel diodes 24 and 26 are connected through a pair of gating diodes 40 and 42 respectively to a negative D.C. supply voltage of —100 volts through a common load resistor 44 of 30.1 kilohms. A small positive D.C. voltage of about +.2 volt is applied to the anode of diode 42 in any suitable manner here represented by battery 46, in order to render such gating diode normally conducting. As a result, about 3 milliamperes of quiescent D.C. current flows through the gating diode 42 between the Zener diode 34 and the load resistor 44.

When a negative trigger signal 48 is applied to input terminal 12, it is inverted and transmitted through the trigger amplifier 10 to the cathode of tunnel diode 24 and the anode of tunnel diode 26 as a positive signal so that the leading edge of such trigger signal is a positive going signal portion which has no effect on tunnel diode 24 but triggers tunnel diode 26 to a high voltage stable state. This produces a positive step voltage of about +.5 volt amplitude on the anode of tunnel diode 26 which is applied as an arming signal 50 through the tunnel diode 24 to the anode of coupling diode 40. Since the amplitude of the arming signal is greater than that of the battery 46, gating diode 40 is rendered conducting and gating diode 42 is rendered nonconducting. This causes the 3 milliamperes of current previously flowing through diode 42, to be transmitted through the tunnel diodes 26 and 24 and gating diode 40 between the Zener diode and the common load resistor 44. As a result of this arming signal 50 the bias current flowing through the tunnel diode 24 increases so that it is just below the peak current of such tunnel diode and enables it to be triggered to a high voltage state by the negative going trailing edge of the same inverted input trigger signal.

An output transformer 52 is provided with its primary winding 54 connected in series between the cathode of tunnel diode 24 and the anode of gating diode 40. The secondary winding 56 of the transformer has one end terminal grounded and its other end terminal connected through a coupling capacitor 58 and a coupling resistor 60 to an output terminal 18. Thus, when the tunnel diode 24 is triggered a negative step voltage 62 is produced on the cathode of such tunnel diode and such step voltage is inverted and differentiated by the transformer 52 and capacitor 58 before being transmitted to the output terminal as a positive spike output trigger pulse 64.

A portion of the output trigger pulse 64 is applied to an input stage 66 of the hold-off multivibrator 20 to start the production of a negative going ramp voltage 68 across a hold-off capacitor 70 connected between the output of such stage and ground. The ramp voltage 68 is applied to the input terminal of an output stage 72 of the hold-off multivibrator 20 to produce a positive going step voltage forming the leading edge of a hold-off signal 74 at the output terminal of such hold-off multivibrator, at a time corresponding to the peak of the ramp voltage. This causes the hold-off capacitor 70 to begin discharging positively toward its quiescent voltage at a rate determined by the setting of the hold-off control 22. When the ramp voltage 68 returns to its quiescent value the hold-off signal 74 terminates.

The output of the hold-off multivibrator 20 is connected to the base of a PNP type switching transistor 76 of silicon, whose emitter is connected to a source of positive D.C. supply voltage of +19 volts and whose base is also connected to the anode of a voltage limiting diode 78 of germanium. The cathode of the limiting diode 78 is connected to a positive D.C. supply voltage of +19 volts and its anode is also connected to a positive D.C. supply voltage of +100 volts through a resistor 80 of 82 kilohms. The collector of transistor 76 is connected to one end of a potentiometer 82 of 20 kilohms having its other end grounded and its movable contact connected to a coupling resistor 84 of 3.15 kilohms in series with a coupling diode 86 to the emitter of transistor 28. A fixed resistor 88 of 432 ohms in series with a variable resistor 90 of 250 ohms are connected across potentiometer 82 and a resistor 84.

Diode 78 is normally nonconducting and the base of the switching transistor 76 is held at about +18.4 volts to quiescently bias such transistor conducting. Current flowing in the emitter to collector circuit of transistor 76 is transmitted through the coupling network including resistors 82, 84, 88 and 90 as well as through diode 86 and transistor 28 to supply bias current for tunnel diodes 24 and 26. It should be noted that the setting of the potentiometer 82 only varies the bias current of tunnel diode 26, since the trigger amplifier 10 supplies a constant current through tunnel diode 24. As a result potentiometer 82 functions as a stability control to vary the triggering level of the arming circuit tunnel diode 26 without changing the triggering level of the trigger recognizer circuit tunnel diode 24 so that the width of the hysteresis region between the triggering levels can be varied to adjust the sensitivity of the trigger countdown circuit. The hold-off signal 74 renders transistor 76 nonconducting and reduces the bias current flowing through both the tunnel diodes 24 and 26 to zero in order to revert such tunnel diodes to their normal low voltage states. Diode 78 limits the reverse bias voltage applied to the base of transistor 76 to about +19.3 volts since such diode is rendered conducting at this voltage due to being made of germanium. When the hold-off signal terminates transistor 76 is again rendered conducting to supply bias current through tunnel diodes 24 and 26. This completes one cycle of operation of the trigger countdown circuit of FIG. 2.

While it is not essential in the "pseudo-Schmitt" operation of the trigger countdown circuit, a transistor 92 is employed as a dynamic load for tunnel diode 24 to form a monostable switching circuit of a type similar to that shown in copending U.S. patent application Ser. No. 341,981, now abandoned, filed Feb. 3, 1964 by John V. Rogers. The transistor 92 has its emitter connected to the cathode of tunnel diode 24 through the primary winding 54 which also acts as a load inductance for such tunnel diode, and its collector connected to the anode of the tunnel diode. Transistor 92 is of the NPN type and has its base connected to a source of positive D.C. supply voltage of +100 volts through a coupling resistor 94 of 100 kilohms. The low voltage of about 0.1 volt applied between the emitter and collector of transistor 92 by tunnel diode 24 normally biases the transistor nonconducting. A resistor 93 of 100 ohms and a capacitor 95 of 47 micromicrofarads are connected in parallel between the emitter and collector of transistor 92. The nonconducting transistor 92 presents a very large load impedance to tunnel diode 24 when such tunnel diode is in its low voltage state. However, when the tunnel diode 24 is triggered the voltage produced between the emitter and collector of transistor 92 is increased sufficiently to render such transistor conducting and this reduces the load impedance of the tunnel diode to a very small value. Thus, the load line of tunnel diode 24 is nonlinear and crosses the current axis with a substantially horizontal slope while crossing the voltage axis with a substantially vertical slope. The component values are such that the dynamic load line provided by transistor 92 crosses the characteristic curve of tunnel diode 24 at a stable state currently slightly less than its peak current and at high voltage slightly less than its valley voltage which means such tunnel diode will operate as a monostable switching circuit. As a result of its extremely high load impedance in its stable state the monostable switching circuit has a substantially constant triggering level regardless of the slope of the trigger pulse because practically all of the trigger pulse current is transmitted through the tunnel diode 24.

In FIG. 3, the wave forms produced by the circuit of FIG. 2 are shown related in time to one another. Thus, when the negative going portion of input signal 48 crosses a lower triggering level 96, the arming circuit tunnel diode 26 is triggered to produce the positive going leading edge of arming signal 50, which enables the trigger recognizer circuit tunnel diode 24 to be triggered when the next successive positive portion of the same trigger signal crosses an upper triggering level 98. The negative going leading edge of the output signal 62 of the tunnel diode 24 is inverted and differentiated to produce the positive output spike pulse 64 which is transmitted to output terminal 18 as the output trigger pulse and also to the hold-off multivibrator 20 to start the generation of the negative going ramp voltage 68. At the maximum amplitude of the ramp voltage 68, the positive going leading edge of the hold-off signal 74 is produced, which reverts the arming circuit to terminate the arming signal 50 and causes the ramp voltage to begin decreasing to its quiescent value. It should be noted that when a bistable switching circuit is employed as the trigger recognizer circuit the hold-off signal 74 can also be used to revert such switching circuit. When the ramp voltage 68 reaches its quiescent value, the hold-off signal 74 terminates so that the next negative going portion of the input trigger signal 48 crossing the lower triggering level 96, triggers the arming circuit to start another cycle of operation.

As stated previously, the width of the hold-off signal 74 may be varied by the hold-off control 22 in order to change the frequency divider multiple of the trigger count-down circuit so that a greater or lesser number of input trigger signals must be received before a single output trigger signal is produced. In addition, both of the triggering levels 96 and 98 may be varied together simultaneously by varying the trigger level adjustment potentiometer 30, since this varies the bias current to both of the tunnel diodes 24 and 26. Furthermore, the distance between the triggering levels 96 and 98 or the hysteresis voltage may be varied by changing the setting of the stability adjustment potentiometer 82 in order to move the lower triggering level 96 with respect to the upper triggering level.

It will be obvious to those having ordinary skill in the art that various changes may be made in the details of the above described preferred embodiment of the present invention. For example, the trigger recognizer circuit and the arming circuit can be formed by transistor multivibrators rather than by tunnel diodes. Therefore, the scope of the present invention should only be determined by the following claims.

I claim:
1. A trigger circuit comprising:
  a first switching circuit having at least one stable state with an input connected to a trigger input terminal of the trigger circuit so that it is triggered by trigger pulses applied to said input terminal and having an output connected to an output terminal of the trigger circuit;
  a second switching circuit having two stable states and connected to said trigger input terminal so that it is triggered at a different level than said first circuit, and having its output connected to said first circuit to transmit an arming signal to the first circuit to enable said first circuit to be triggered only after said second circuit has been triggered;
  a third switching circuit having at least one stable state with its input connected to the output of said first circuit so that said third circuit is triggered in response to the triggering of said first circuit; and
  means for connecting the output of said third circuit to said second circuit for reverting said second circuit to its quiescent stable state and for applying a hold-off signal to the second circuit to prevent said second circuit from being retriggered for a predetermined time.

2. A trigger circuit comprising:
  a first switching circuit having at least one stable state with an input connected to a trigger input terminal of the trigger circuit so that it is triggered by trigger pulses applied to said input terminal and having an output connected to an output terminal of the trigger circuit;
  a second switching circuit having two stable states with an input connected to said input terminal so that it is triggered at a different level on an earlier portion of the same trigger pulse which triggers the first circuit, and having an output connected to said first circuit to transmit an arming signal to the first circuit to enable said first circuit to be triggered only after said second circuit has been triggered;
  a monostable switching circuit having its input connected to the output of the first circuit so that said monostable circuit is triggered in response to the triggering of said first circuit; and
  means for connecting the output of the monostable circuit to the second circuit for reverting said second circuit to its quiescent stable state, for causing the first circuit to return to its quiescent state, and for applying a hold-off signal to the second circuit to prevent it from being retriggered for a predetermined time.

3. A trigger countdown circuit comprising:
  a first switching circuit including a first negative resistance semiconductor device connected as a monostable circuit having an input connected to a trigger input terminal of the countdown circuit so that it is triggered by trigger pulses applied to said input terminal and having an output connected to an output terminal of the countdown circuit;
  a second switching circuit including a second negative resistance semiconductor device connected as a bistable circuit having an input connected to said input terminal so that it is triggered at a different level on an earlier portion of the same trigger pulse which triggers the first circuit, and having an output connected to said first circuit to transmit an arming signal to the first circuit to enable said first circuit to be triggered only after said second switching circuit has been triggered;
  a monostable switching circuit having its input connected to the output of the first circuit so that said monostable circuit is triggered in response to the triggering of said first circuit; and
  means for connecting the output of the monostable circuit to the second circuit for reverting said second circuit to its quiescent stable state and for applying a hold-off signal to the second circuit to prevent it from being retriggered for a predetermined time so that a plurality of trigger pulses are applied to the input terminal for each output pulse transmitted from the output terminal of the countdown circuit.

4. A trigger countdown circuit comprising:
  a first switching circuit including a negative resistance semiconductor device connected as a bistable circuit having an input connected to a trigger input terminal of the countdown circuit so that it is triggered by a first portion of an input trigger pulse applied to said input terminal and having an output connected to an output terminal of the countdown circuit;
  a second switching circuit including another negative resistance semiconductor device connected as a bistable circuit having an input connected to said input terminal so that it is triggered at an earlier time and a different level on a second portion of the same trigger pulse which triggers the first circuit, said second portion having a slope of opposite polarity to that of said first portion of the input trigger pulse, and having an output connected to said first circuit to transmit an arming signal to the first circuit to enable said first circuit to be triggered only after said second circuit has been triggered;
  a monostable switching circuit having its input connected to the output of the first circuit so that said monostable circuit is triggered in response to the triggering of said first circuit; and
  means for connecting the output of the monostable circuit to the first and second circuits for reverting said first and second circuits to their quiescent stable states and for applying a hold-off signal to the second circuit to prevent said second circuit from being retriggered for a predetermined time so that a plurality of trigger pulses are applied to the input terminal for 5. A trigger countdown circuit comprising:
a first switching circuit including a first tunnel diode connected as a monostable circuit having an input connected to a trigger input terminal of the countdown circuit so that it is triggered by trigger pulses applied to said input terminal and having an output connected to an output terminal of the countdown circuit;
a second switching circuit including a second tunnel diode connected as a bistable circuit in series with said first tunnel diode and said input terminal but of opposite polarity as said first tunnel diode, having an input connected to said input terminal so that it is triggered at a different level on an earlier portion of the same trigger pulse which triggers the first circuit, and having an output connected to said first circuit to transmit an arming signal to the first circuit to enable said first circuit to be triggered only after said second circuit has been triggered;
a monostable switching circuit having its input connected to the output of the first circuit so that said monostable circuit is triggered in response to the triggering of said first circuit; and
means for connecting the output of the monstable circuit to the second circuit for reverting said second circuit to its quiescent stable state and for applying a hold-off signal to the second circuit to prevent it from being retriggered for a predetermined time so that a plurality of trigger pulses are applied to the input terminal for each output pulse transmitted from the output terminal of the countdown circuit.

6. A trigger countdown circuit comprising:
a first switching circuit including a first tunnel diode connected as a monostable circuit having an input connected to a trigger input terminal of the countdown circuit so that it is triggered by trigger pulses applied to said input terminal and having an output connected to an output terminal of the countdown circuit;
a second switching circuit including a second tunnel diode connected as a bistable circuit in series with said first tunnel diode and said input terminal but of opposite polarity as said first tunnel diode, having an input connected to said input terminal so that it is triggered at a different level on an earlier portion of the same trigger pulse which triggers the first circuit, and having an output connected to said first circuit to transmit an arming signal to the first circuit to enable said first circuit to be triggered only after said second circuit has been triggered;
bias means including a source of additional D.C. bias current, a pair of first and second gating diodes, each connected between the current source and a different one of the tunnel diodes, and means for quiescently biasing the first gating diode connected to the second tunnel diode conducting and the second gating diode nonconducting to normally transmit the additional bias current away from the first tunnel diode and for rendering the first gating diode nonconducting and the second gating diode conducting when the second tunnel diode is triggered to transmit such additional bias current to the first tunnel diode as the arming signal;
a monostable switching circuit having its input connected to the output of the first circuit so that said monostable circuit is triggered in response to the triggering of said first circuit; and
means for connecting the output of the monostable circuit to the second circuit for reverting said second circuit to its quiescent stable state and for applying a hold-off signal to the second circuit to prevent it from being retriggered for a predetermined time so that a plurality of trigger pulses are applied to the input terminal for each output pulse transmitted from the output terminal of the countdown circuit.

7. A trigger countdown circuit comprising:
a first switching circuit including a first tunnel diode connected as a monostable circuit having an input connected to a trigger input terminal of the countdown circuit so that it is triggered by trigger pulses applied to said input terminal and having an output connected to an output terminal of the countdown circuit;
a second switching circuit including a second tunnel diode connected as a bistable circuit in series with said first tunnel diode and said input terminal but of opposite polarity as said first tunnel diode, having an input connected to said input terminal so that it is triggered at a different level on an earlier portion of the same trigger pulse which triggers the first circuit, and having an output connected to said first circuit to transmit an arming signal to the first circuit to enable said first circuit to be triggered only after said second circuit has been triggered;
bias means including a source of additional D.C. bias current, a pair of first and second gating diodes, each connected between the current source and a different one of the tunnel diodes, and means for quiescently biasing the first gating diode connected to the second tunnel diode conducting and the second gating diode nonconducting to normally transmit the additional bias current away from the first tunnel diode and for rendering the first gating diode nonconducting and the second gating diode conducting when the second tunnel diode is triggered to transmit such additional bias current to the first tunnel diode as the arming signal;
a monostable switching circuit including a transistor having its emitter and collector connected across the first tunnel diode so that it is quiescently nonconducting to provide a high load impedance for said first tunnel diode and is rendered conducting to provide a low load impedance after the first tunnel diode is triggered, said monostable circuit having its input connected to the output of the first circuit so that said monostable circuit is triggered in response to the triggering of said first circuit; and
means for connecting the output of the monostable circuit to the second circuit for reverting said second circuit to its quiescent stable state and for applying a hold-off signal to the second circuit to prevent it from being retriggered for a predetermined time so that a plurality of trigger pulses are applied to the input terminal for each output pulse transmitted from the output terminal of the countdown circuit.

8. A trigger circuit comprising:
a first switching circuit means having at least one stable state with an input connected to a trigger input terminal of the trigger circuit so that it is triggered from said one stable state to another state by a trigger pulse applied to said input terminal to produce an output pulse and having an output connected to an output terminal of the trigger circuit;
a second switching circuit means having two stable states and connected to said trigger input terminal so that it is triggered from a first stable state to a second stable state by a different portion of said trigger pulse than the first circuit, and having its output connected to said first circuit to transmit an arming signal to the first circuit to enable said first circuit to be triggered only after said second circuit has been triggered; and
means for reverting said second circuit to its first stable state at least as late as the time the first circuit returns its said one stable state and for applying a hold-off signal to the second circuit to prevent said second circuit from being retriggered for a predetermined time after the second circuit is reverted to its first stable state.

9. A trigger circuit in accordance with claim 8 in which the means for reverting said second switching circuit and applying said hold-off voltage comprises a third switching circuit having at least one stable state and connected to be triggered from said one stable state to another state by said output pulse.

References Cited

UNITED STATES PATENTS

| | | | |
|---|---|---|---|
| 3,040,185 | 6/1962 | Horton | 307—88.5 |
| 3,215,948 | 11/1965 | Dalton | 307—88.5 |

ARTHUR GAUSS, *Primary Examiner.*

S. D. MILLER, *Examiner.*